Figure 1:
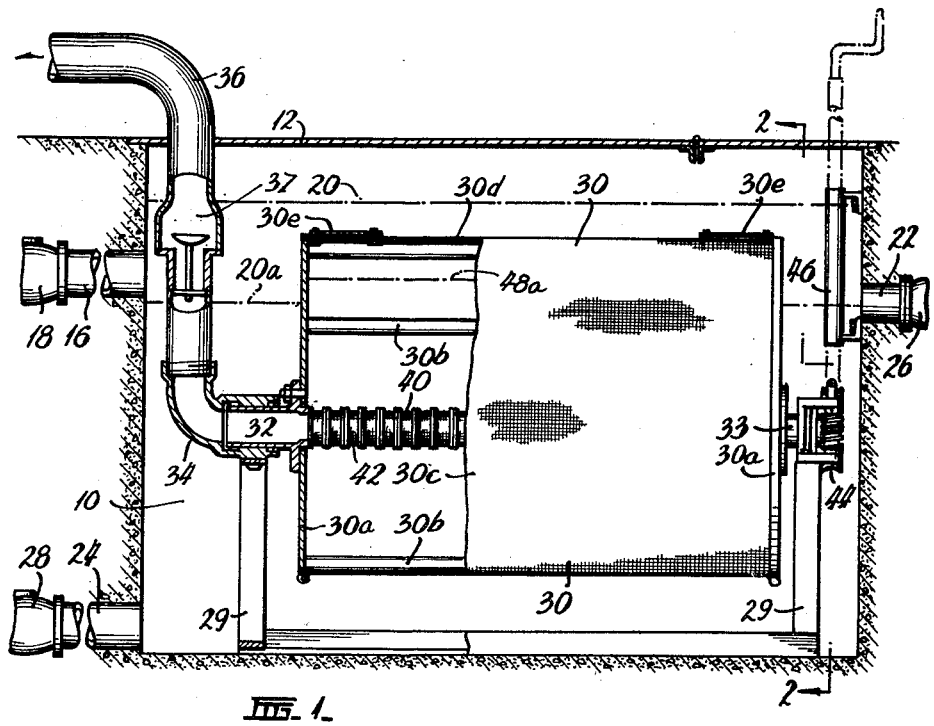

June 22, 1965 — M. J. MARTIN — 3,190,452
GRANULAR BED FILTER
Filed Feb. 15, 1962 — 4 Sheets-Sheet 1

INVENTOR.
MICHAEL JAMES MARTIN
By Young & Thompson
ATTYS.

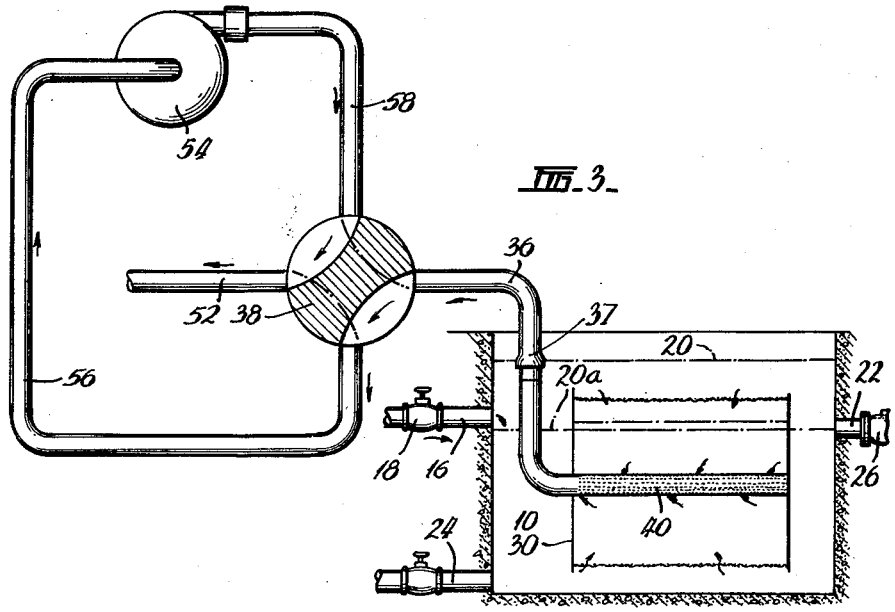
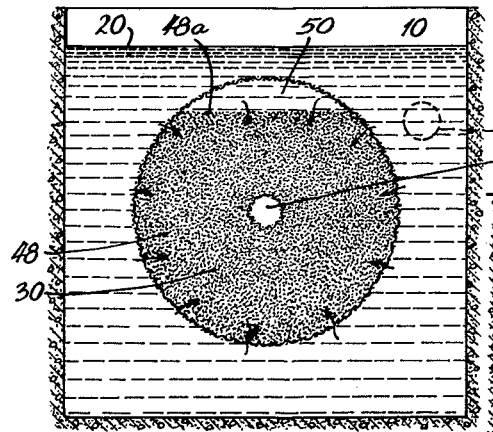
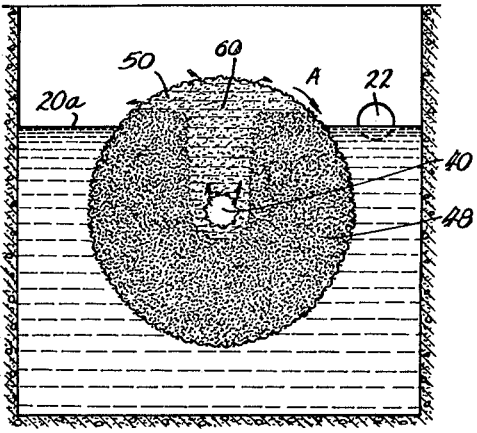
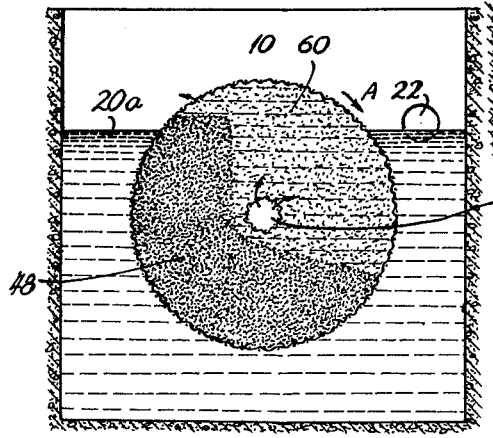
INVENTOR
MICHAEL JAMES MARTIN

June 22, 1965  M. J. MARTIN  3,190,452
GRANULAR BED FILTER

Filed Feb. 15, 1962  4 Sheets-Sheet 3

INVENTOR
MICHAEL JAMES MARTIN
By Young & Thompson
ATTYS.

3,190,452
GRANULAR BED FILTER
Michael James Martin, Princes Highway, Springvale, Victoria, Australia
Filed Feb. 15, 1962, Ser. No. 173,430
Claims priority, application Australia, Feb. 16, 1961, 1,529/61
4 Claims. (Cl. 210—278)

This invention relates to liquid filters of the kind having a filter bed of sand or other suitable granular material, the term granular material being herein used to comprehend all discrete or particulate material suitable for the purpose.

During filtration, the liquid usually passes downwardly through the bed so that as the operation proceeds, the resistance offered thereby to the flow of the liquid progressively increases, due to the deposition of solid material on the upper surface and within the upper zone of the bed.

It is therefore necessary to cleanse the bed at suitable intervals and this is usually accomplished by a backwashing operation which is carried out by passing filtered water upwardly through the bed at a velocity which is sufficiently high to cause the granules to be hydraulically suspended and violently agitated.

In some filters, however, the bed is agitated by rakes or the like or by compressed air during the backwashing operation, in which case, the backwash velocity may be considerably lower and the expenditure of filtered water is correspondingly reduced.

Now the general object of this invention is to provide improvements in filters of the granular bed type, while one specific object is to provide such a filter having an increased filtering area relatively to the volume of the filter bed.

A filter according to the invention comprises a chamber for the liquid to be filtered, a perforate cage arranged within the chamber and adapted to contain a filter bed of granular material, means supporting the cage for angular movements about an approximately horizontal axis, and means forming a liquid passage which communicates with the interior of the filter bed for the discharge of filtrate therefrom during filtration and for the supply of liquid thereto in order to backwash the filter bed.

The said filter may be used for gravity, pressure or suction filtration and in the case of a pressure filter, the said chamber is closed and the liquid to be filtered is supplied thereto under pressure, while in order to backwash the filter bed, liquid under pressure is supplied to the interior of the bed through the said passage and the wash water is discharged from the chamber after passing outwardly through the bed.

In the case of a suction filter, the chamber may be open at the top and during filtration, the filtrate is withdrawn by a pump from the interior of the bed through the said passage, while the backwashing operation is again carried out by directing liquid under pressure into the interior of the bed through the said passage.

In order that the bed may be loosened and agitated during the backwashing operation, it does not completely fill the cage during filtration so that a free liquid space is arranged above it and within the cage.

Preferably the said cage is approximately of horizontal cylindrical form and is rotatable about an axis extending approximately longitudinally through the interior thereof, while a perforate collector tube is preferably arranged approximately longitudinally within the cage and at or near the center of the bed therein for the discharge of filtrate therefrom and the supply of wash liquid thereto.

The said cage may be of circular, polygonal or other similar shape in cross-section, though for the reason hereinafter mentioned, the cross-sectional shape may advantageously be one which is elongated in one direction, e.g. an oval.

According to a modification, provision is made for discharging waste wash liquid directly from the interior of the cage.

Figure 2:
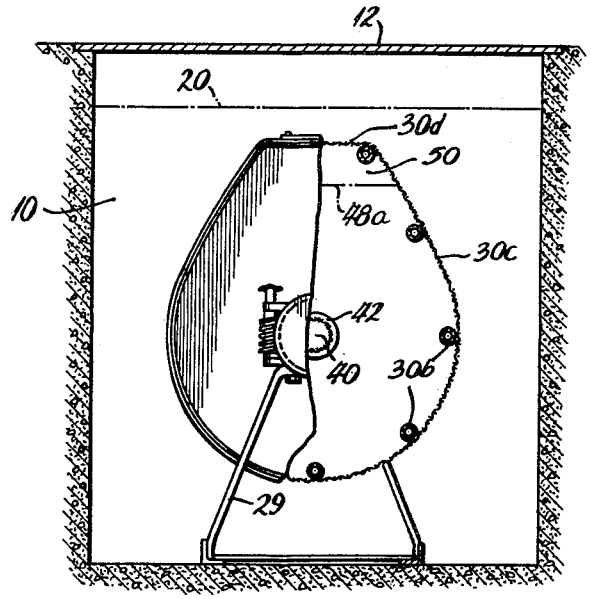
Figure 7:
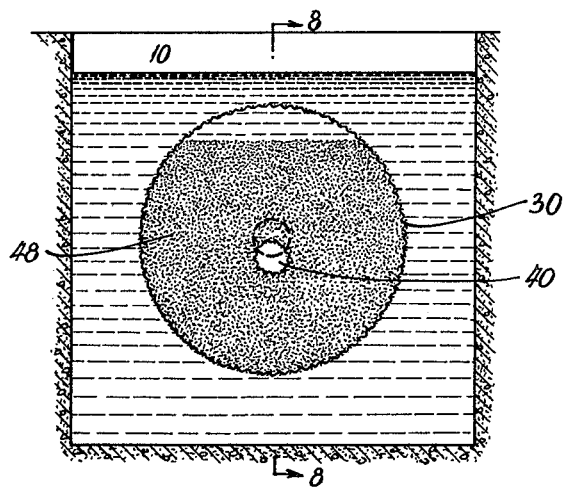
Figure 8:
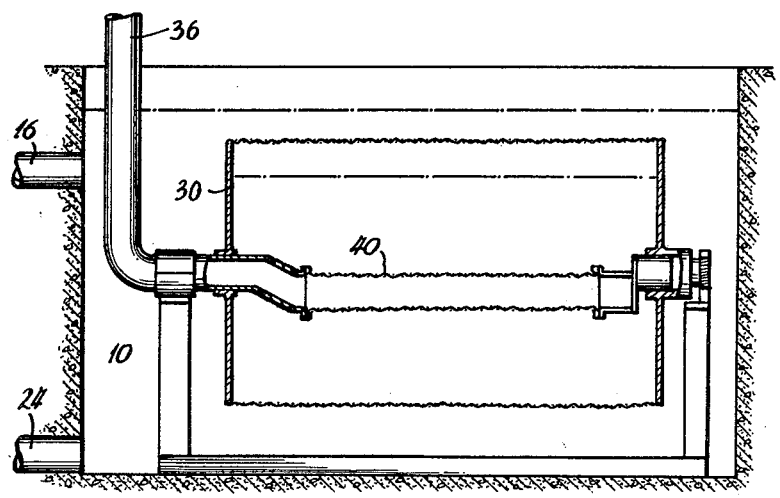
Figure 9:
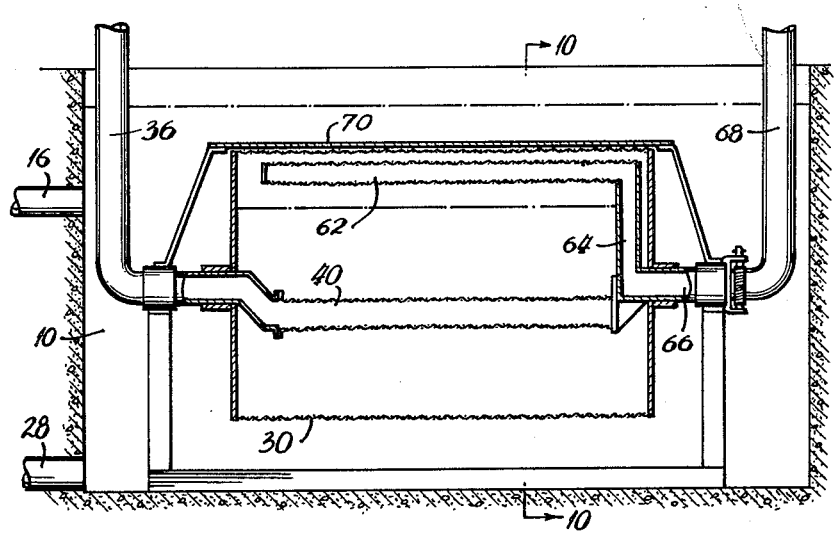
Figure 10:
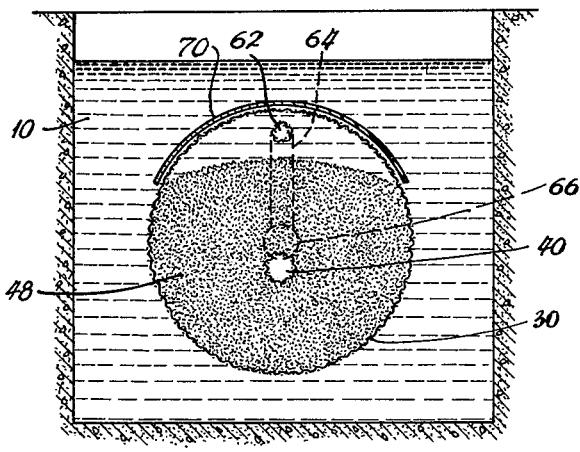

In the following more detailed description of particular forms of the invention, reference is made to the accompanying drawings, in which:

FIGURE 1 is a view in sectional side elevation of a suction filter according to the invention, FIGURE 2 is a view in sectional end elevation taken on the line 2—2 of FIGURE 1, FIGURE 3 is a diagram illustrating the operation of the filter, FIGURE 4 is a diagrammatic view in end elevation illustrating the filtering operation, FIGURES 5 and 6 are views similar to FIGURE 4 and show successive stages of the backwashing operation, FIGURE 7 is a view in end elevation of a filter showing the collector tube arranged concentrically, FIGURE 8 is a view in sectional side elevation taken on the line 8—8 of FIGURE 7, FIGURE 9 is a view in sectional side elevation showing a modification of the discharge means for waste wash water, and FIGURE 10 is a view in sectional end elevation taken on the line 10—10 of FIGURE 9.

The suction filter shown in FIGURES 1 and 2 comprises an open rectangular chamber 10 covered at the top by removable cover plates 12 which may be flush with, say, the surround 14 of a swimming pool (not shown).

A supply pipe 16 fitted with a shut-off valve 18 connects the interior of the chamber to the pool or other source of liquid to be filtered and is arranged below the level of the water therein so that the chamber is normally filled to the same level, which is designated 20 in the drawings. The chamber is also fitted with a waste wash water discharge pipe 22 and with a drain pipe 24 which are normally closed by valves 26 and 28 respectively.

A frame structure arranged within the chamber comprises spaced end standards 29 which support the opposite ends of a rotatable horizontal drum generally designated 30. This drum comprises end plates 30a which are connected adjacent to the periphery thereof by longitudinally extending rods 30b arranged at suitable distances apart and serving to support a lining of perforated sheet metal which in turn supports a peripheral wrapping 30c of fine wire gauze which forms a retaining screen for the granular material forming the filter bed. As illustrated, the said end plates 30a are imperforate, though if desired, they, and particularly the outer portions thereof, may also be constructed similarly to the periphery of the drum.

The drum is provided centrally at its opposite ends with outwardly projecting coaxial trunnions 32 and 33 of which the latter is supported in a half bearing on the upper end of one of the standards 29.

The other trunnion 32 is hollow so as to communicate with the interior of the drum and is rotatively mounted in a bearing formed by the adjacent end of an elbow 34 supported non-rotatively on the upper end of the other standard 29.

The opposite upper end of the elbow is connected to a filtrate discharge pipe 36 which extends upwardly through the top of the chamber 10 and is connected to a control valve 38 (FIGURE 3). The pipe 36 is fitted with a suitable restrictor valve shown diagrammatically in FIGURE 1.

A collector tube 40 arranged axially within the drum has its opposite ends supported by the respective trunnions and the interior of this tube communicates freely with the aforesaid elbow 34 through the hollow trunnion 32. The wall of the collector tube is formed with closely spaced openings and has a layer 42 of fine wire gauze wrapped therearound and suitably secured thereto.

When viewed in cross-section, as in FIGURE 2, the drum 30 is approximately of oval shape with the top 30d thereof flattened, while the lower part thereof is semi-circular with its center of curvature coinciding with the rotational axis and with the axis of the collector tube. The said flattened top 30d is provided with two access openings which normally are closed by removable cover plates 30e.

Suitable means are provided for rotating the drum either manually or by power and in the illustrated construction, the trunnion 33 is connected by worm and wormwheel gearing 44 to the lower end of a vertical spindle 46 arranged with the chamber and adapted at its upper end for the attachment thereto of a hand crank.

In use, the interior of the drum is incompletely filled with sand, granular calcium silicate or other suitable granular material to form a filter bed 48 therein with its upper surface disposed approximately at the position designated 48a in FIGURE 2 so as to provide a free space 50 above it and within the drum. This free space is necessary to permit the bed to be loosened and agitated during the backwashing operation hereinafter described and the illustrated oval shape of the drum enables this free space to be provided without reducing the depth of the bed above the collector tube. This will be more apparent from a consideration of FIGURE 4 which shows a drum 30 of circular shape in cross-section and in which the depth of the bed above the axis is significantly less than the radius of the drum.

Reverting now to FIGURE 3, the illustrated control valve 38 is a four-way plug valve and a pipe 52 connected thereto in coaxial alignment with the pipe 36 serves to return the filtered water to the pool or to deliver it to service as required.

A suction pump 54 has its inlet pipe 56 connected to another port of the valve while the pump delivery pipe 58 is connected to the remaining port thereof.

During the filtering operation, the drum 30 is arranged as shown in FIGURE 2 and the control valve as shown in FIGURE 3. Thus, filtered water is continuously withdrawn from the collector tube 40 by the pump 54 and delivered to the pool while impure water from the pool continuously passes into the chamber 10 through the pipe 16 and thence radially through the filter bed to the collector tube as diagrammatically shown in FIGURE 4, the drum at this time being completely submerged in the water in the chamber. The surface area of the filter bed is thus large in proportion to its volume.

In order to cleanse the filter bed, the valve 18 in the pipe 16 is closed to prevent the inflow of water from the pool and the valve 26 in the waste wash water discharge pipe 22 is opened so that the level of the water in the chamber 10 falls to the level 20a thereof as it has been found advantageous for the top of the drum to be disposed above the level of the water in the chamber during the backwashing operation, though this is not essential.

The plug of the control valve 38 is then moved to its opposite position (shown in broken lines in FIGURE 3) and the pump is operated. Water is then withdrawn from the pool and is delivered under pressure to the collector tube 40 from which it passes outwardly through the filter bed into the chamber 10.

It is, however, found that this wash water tends to flow mainly upwards whereby it cuts a channel 60 through the bed to the free space 50 at the top of the drum thus breaking up this portion of the bed and agitating the particles thereof as diagrammatically shown in FIGURE 4.

The drum is then turned in one direction as shown by the arrows A in FIGURES 4 and 5, and preferably at a relatively slow rate, so that the trailing side of the channel 60 in the bed is progressively eroded away as indicated in FIGURE 5. Thus when the drum has turned through one complete revolution, the entire bed has been loosened and agitated. The direction of rotation may be reversed from time to time, though it appears that the best results are obtained by turning the drum slowly in one direction.

The rate of flow of the liquid during the backwashing operation may be relatively low and is preferably less than the rate of flow during filtration in order that the granules will not be pressed so tightly against the inner periphery of the cage as to clog the openings therein. For this purpose, the aforesaid restrictor valve in the filtrate discharge pipe 36 is constructed so as to open fully during filtration and to close to a suitable extent when the liquid flows in the opposite direction during the backwashing operation.

After the bed has been cleansed as described, filtration is resumed by restoring the several valves to their original positions.

It will be apparent that, if desired, the described backwashing operation may be carried out automatically under the control of means responsive to the drop in pressure across the filter bed. Thus the pressure responsive means may actuate switches to cause the appropriate valves to be opened and closed and to cause a motor to turn the drum slowly through one revolution or more.

FIGURES 7 and 8 illustrate a modified filter wherein the drum 30 is of circular shape in cross-section and in which the collector tube 40 is arranged slightly below the axis of rotation so as to be approximately midway between the top of the bed and the bottom of the drum which, for this purpose, is rotatively mounted on upwardly cranked end supports for the collector tube.

If desired, some of the wash water may be discharged directly from the interior of the upper portion of the drum so as to obviate or reduce contamination of the body of water in the chamber 10. One way of achieving this result is shown in FIGURES 9 and 10 wherein the drum 30 is rotatively mounted on fixed supports for the collector tube 40 as in the filter shown in FIGURES 7 and 8. A perforated wash water collecting tube 62 is arranged longitudinally and in a fixed position within and near the top of the drum and has one of its ends connected by a radial pipe 64 to the interior of the adjacent fixed tube 66 by which the corresponding end of the drum is rotatively supported and the outer end of this bearing tube is connected to a waste wash water discharge pipe 68. This pipe 68 may be connected to a suction pump.

The flow of wash water from the interior of the upper part of the drum into the chamber 10 may also be prevented or restricted during the backwashing operation by means of an arcuate hood or cover 70 which may, for example, be formed of a flexible plastic material. During filtration, this cover is removed or raised but for the cleansing operation, it is arranged substantially as shown in the drawings.

I claim:
1. A filter comprising a chamber for liquid to be filtered, a substantially horizontally disposed hollow drum arranged within the chamber so as normally to be immersed in the liquid therein, a filter bed of granular material, contained in and almost completely filling the drum whereby a free space is formed within the drum and above the surface of the bed, a screen forming the peripheral wall of said drum, the said screen being so constructed as to retain the granular material while permitting liquid to pass freely therethrough, means supporting the drum for rotation about a substantially horizontal axis passing longitudinally therethrough, a first hollow collector member arranged approximately centrally within the drum, means forming a passage communicating with the interior of said hollow collector member and the exterior of the chamber for the discharge of filtrate from the filter and means to alternatively supply wash liquid thereto thereby to backwash the filter bed, a second hol- low collector member, said second collector member being arranged longitudinally in a fixed position within the rotatable drum and near the top thereof so as to remain stationary when the drum is rotated, said second collector member being normally disposed within the aforesaid free space and serving to collect waste wash liquid when the filter bed is backwashed, and means forming a passage communicating with said second collector member and the exterior of the chamber for the discharge of waste wash liquid from the filter, and means for rotating the drum about said axis.

2. A filter as claimed in claim 1, and an imperforate member removably mounted within the chamber and above the drum to be disposed close to the periphery thereof during the backwashing operation thereby to restrict the outward flow of waste wash liquid through the drum above and in the vicinity of said second hollow collector member.

3. A filter as claimed in claim 1, said means supporting the drum for rotation comprising bearing means disposed at each end of the drum, said second hollow collector member communicating with the exterior of the chamber through one of said bearing means at one end of the drum.

4. A filter as claimed in claim 3, said first hollow collector member communicating with the exterior of the chamber through the other of said bearing means at the other end of the drum.

References Cited by the Examiner
UNITED STATES PATENTS

| | | | |
|---|---|---|---|
| 348,534 | 8/86 | Roeske | 210—267 |
| 630,870 | 8/99 | Driesbach | 210—278 |
| 662,556 | 11/00 | Brix | 210—267 |
| 873,458 | 12/07 | Reeves et al. | 210—267 |
| 2,970,696 | 2/61 | Mummert | 210—411 |

REUBEN FRIEDMAN, *Primary Examiner.*

HERBERT L. MARTIN, *Examiner.*